Sept. 29, 1959 E. R. KRETZMER 2,906,816

METHOD AND APPARATUS FOR REDUCING TELEVISION BANDWIDTH

Filed July 24, 1956 2 Sheets-Sheet 1

INVENTOR
E. R. KRETZMER
BY Hugh S. Wertz
ATTORNEY

INVENTOR
E. R. KRETZMER
BY Hugh S. Wertz
ATTORNEY 2,906,816
Patented Sept. 29, 1959

2,906,816

METHOD AND APPARATUS FOR REDUCING TELEVISION BANDWIDTH

Ernest R. Kretzmer, New Providence, N.J., assignor to Bell Telephone Laboratories, Incorporated, New York, N.Y., a corporation of New York Application July 24, 1956, Serial No. 599,773
8 Claims. (Cl. 178—6.8)

This invention relates to wide band transmission systems and more particularly to means for reducing the bandwidth requirements for such systems.

In a communication system in which a wave consisting of a series of signal segments following each other in time sequence is employed to describe the message, economy in bandwidth can be realized by transmitting only a fraction of the total number of message segments available. Preferably, each of the selected segments is stretched in the time dimension to fill the gap left in the wave train by the elimination of the number of segments. At the receiving station, the wave is restored to its original dimension in time, and the blank intervals are filled in by reading out each received portion successively an appropriate number of times. One proposal of this general type is described by H. W. Dudley in his Patent 2,115,803, dated May 3, 1938.

Although a system of discarding and stretching makes possible, theoretically at least, any desired reduction in bandwidth, the reduction is at the expense of total information. Moreover, when portions of the signal are discarded, there is a resulting abruptness with which the waveform of each group of periods changes with respect to that of the next such group. Thus, for example, when two out of each group of three successive message periods are eliminated at the transmitter, the transmission bandwidth can in principle be reduced by a factor of three, subject, however, to possible severe signal discontinuity.

In the case of television signals, complete frame signals may be eliminated at the transmitter, for example, and the remaining frame signals stretched to fill the gaps prior to transmission. In the receiver, after the frame signal is compressed in time, it may be stored and repeated at the conventional rate to produce a display. Since the repetition rate of successive field signals is normal in such a system, no additional flicker is visible to the eye; yet the apparent continuity of motion in some scenes may be seriously impaired. That is to say, in a television signal in which only selected frame signals are transmitted, a finite amount of motional information is lost. Hence, the reconstruction of the picture scene in such a system is necessarily limited by the information available at the receiver, i.e., by the information included in the transmitted signal. Additionally, the motional advantage of interlaced scanning may be substantially lost.

It is therefore the principal object of the present invention to effect a reduction in the bandwidth requirements of a communication system while avoiding the disadvantages just mentioned.

A more specific object of this invention is to improve the continuity of motion in a television signal transmitted over a reduced bandwidth channel.

Other objects are to provide apparatus and methods for accomplishing the above-stated objects.

In accordance with a preferred embodiment of this invention, the objectionable results above described are to a large extent mitigated by providing means for superposing at the transmitter a group of successive television frame signals to produce an average frame signal representative of the group. Additional means are provided for selecting these average frame signals for transmission, and for modifying each average frame signal in time or otherwise so that it occcupies the time period formerly occupied by the entire group that it represents. If desired, the discarded frames may be replaced by frames from another television signal, thereby permitting a number of television signals to be transmitted in one standard channel. At the receiver, the selected average frame is restored to its original dimensions and read out a number of times so that the gap left in transmission is filled in to reproduce the original video signal.

One important advantage of this system is that the reproduced picture approximates more nearly the picture that would be obtained by transmitting each successive frame. This is primarily due to the fact that an average frame contains considerably more information about the overall sequence of frames than does any one single frame used to represent the group. Moreover, because the acuity of the eye is somewhat less for the portrayal of moving objects than for the portrayal of stationary ones, an observer requires less sharpness in such a portrayal and is more willing to tolerate a blurring which may result from this scheme in preference to jerking or motional jumps.

According to the invention, each frame to be transmitted is replaced by a weighted superposition, or average of itself and a number of its neighbors. The group of frames involved may be simply a pair of frames or a large number of appropriately weighted frames selected in a variety of ways. While a two-to-one reduction, the result of transmitting 15 average frames per second instead of the usual 30 independent frames, may prove satisfactory, 10, 7½, or even fewer frames per second might be used depending upon the amount of smearing that can be tolerated.

In order to facilitate an understanding of the principles of the present invention, the frame averaging scheme can be looked at from a totally different point of view. Considering the picture scene to be composed of a multiplicity of individual dots, each dot then has certain constraints imposed upon the rapidity with which its brightness may change. It will be noted that frame averaging has the effect of modifying the brightness response of each dot and making its individual response optimum through an appropriate choice of weighting coefficients in the frame superposition. Hence, in the limit, the effect approaches that obtained if each individual dot brightness is transmitted over an individual channel of optimum bandwidth shaping.

Another way of describing the principles of the invention makes use of photographic terms as applied to motion picture techniques. Consider, by way of example, two or more motion picture film records of the same sequence of motion, i.e., identical film copies of the same scene. If these copies are then displaced one from another by one frame, a subsequent projection or scansion of the frame will produce an average picture which contains considerably more information about the motional changes in the scene than does any one frame alone. If there has been a considerable amount of motional activity between selected frames, a subsequent display of a series of selected average frames, each repeated a number of times to replace gaps left by the omission of a number of the original frames, will produce a more pleasing display than one produced by a series of repetitions of the originally selected (unaveraged) frames. As pointed out above, flicker is no problem since the normal repetition rate is employed while apparent continuity of motion is manifestly improved.

It is apparent that the receiving apparatus and the transmitting apparatus must operate in synchronism. However, if standard television frames are being used as the message interval, there is no additional problem presented inasmuch as conventional synchronizing information may be utilized. In other systems, simple period markers may be added to the signal before transmission to insure synchronism.

The invention, its objects and advantages will be better understood by referring to the following more detailed description taken in connection with the accompanying drawings, in which.

Figure 2:
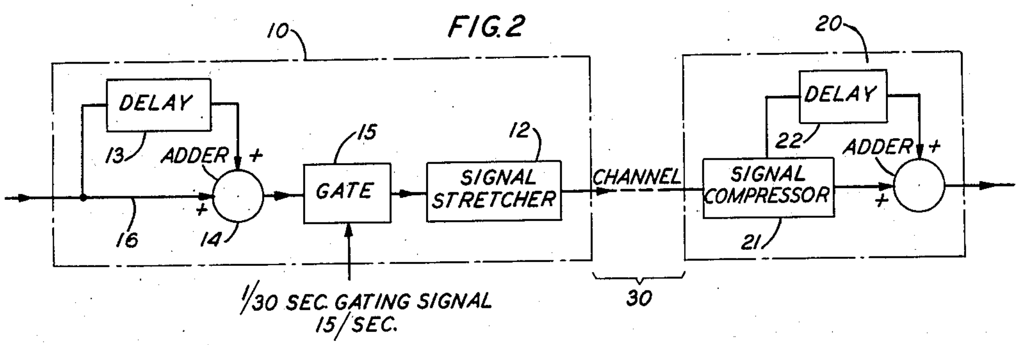
Fig. 2 is a block diagram of an exemplary embodiment of the reduced bandwidth transmission system according to the present invention.
Figure 3:
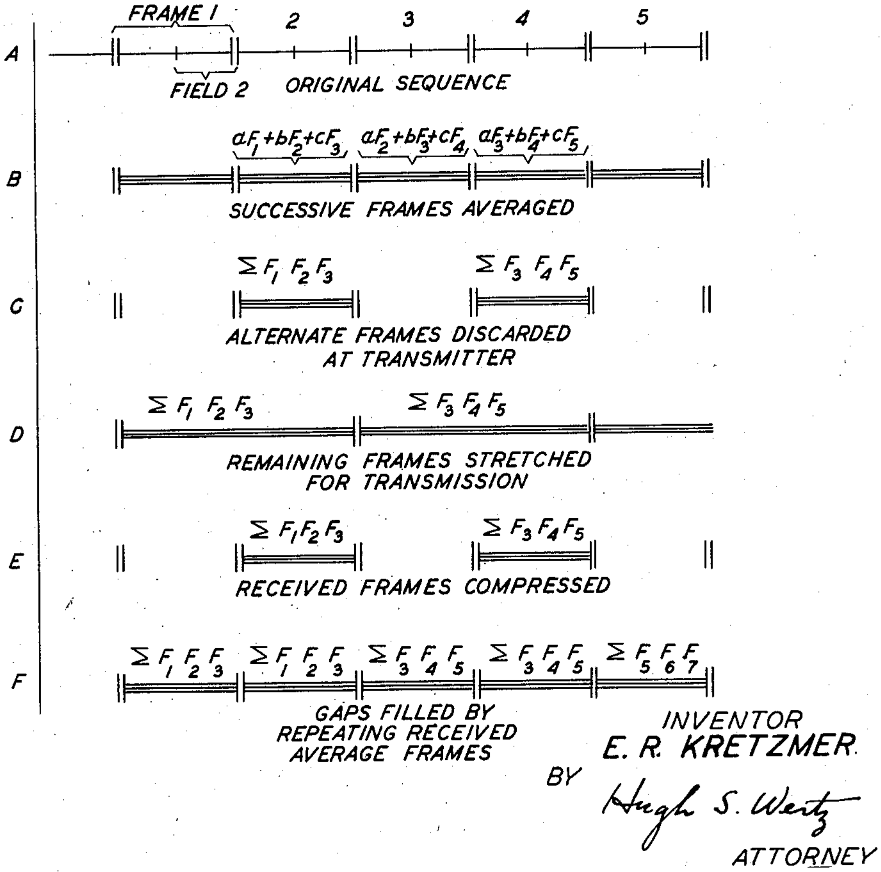
Figure 4:
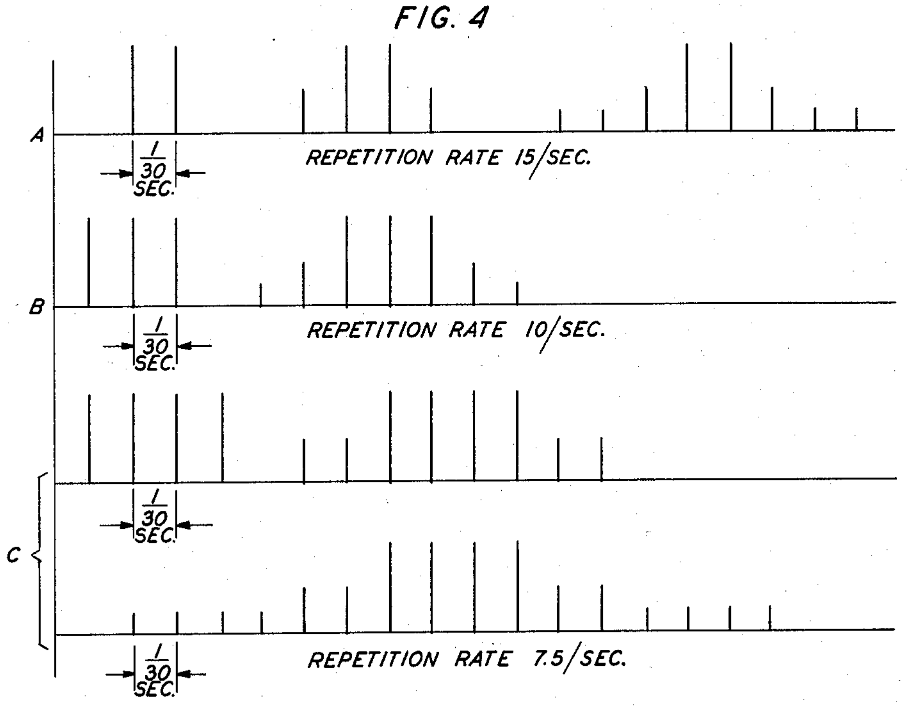
Figure 5:
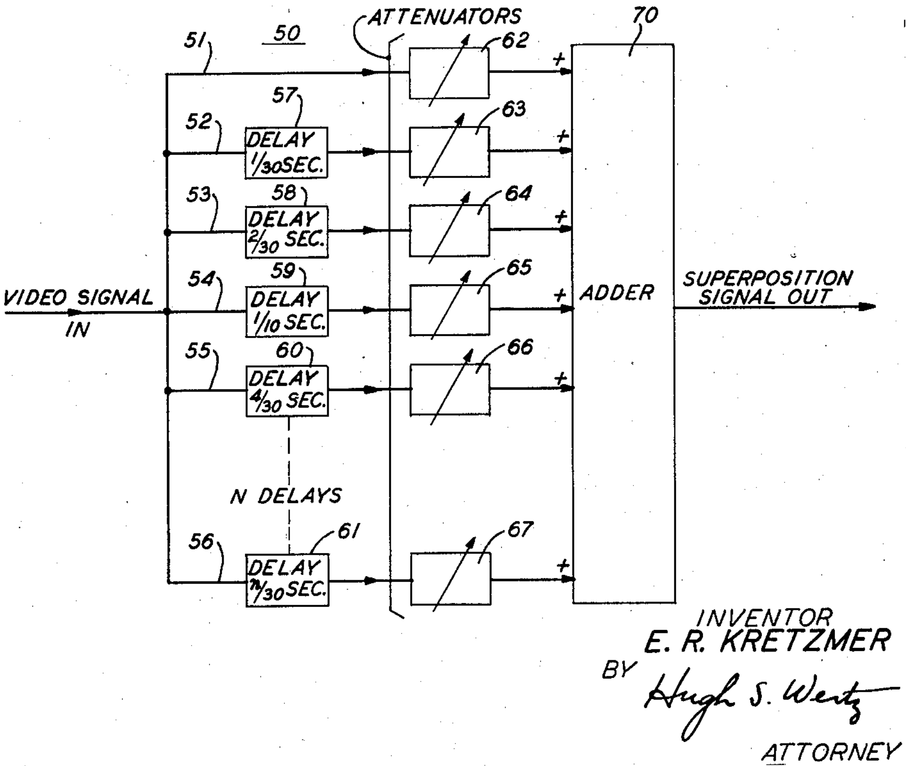

Fig. 3 consists of a series of graphs helpful in describing the operation of Fig. 2;

Fig. 4 is a series of graphs illustrating various arrangements of frame superpositions in accordance with the invention; and Fig. 5 shows in block diagram form a circuit of the invention which may be used for superposing a number of television frames.

Figure 1:
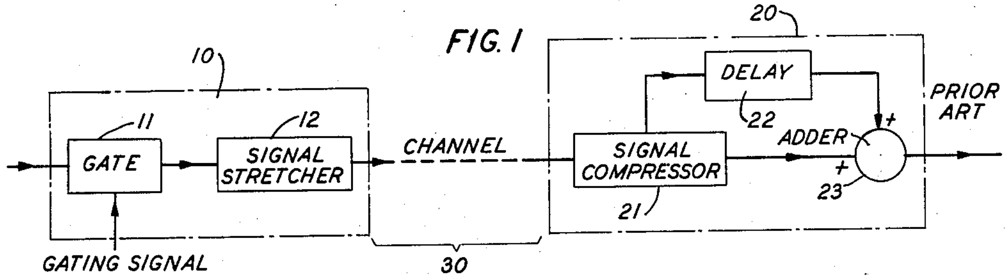
Fig. 1 is an overall block diagram of a simple prior art system for reducing channel capacity by periodically discarding information.

Referring now to Fig. 1, there is shown in simplified block schematic form the elements of a transmitter 10 and receiver 20 suitable for achieving a reduction in transmission channel capacity by the discarding and stretching process outlined above. According to this simple instrumentation of the prior art systems, regularly spaced segments of the signal are completely discarded, the discarded segments being equal in length to the remaining segments. For example, alternate frames of a television signal may be discarded. This is achieved by supplying a message signal derived from any convenient source to a gating circuit 11 which periodically connects the signal to a signal stretching circuit 12. The gating circuit 11, which may be of the type disclosed in United States Patent 2,576,026 to L. A. Meacham dated November 20, 1951, is activated by repetitive gating pulses derived from any convenient source such as a synchronizing generator in accordance with well-known principles.

Signal stretcher 12 may advantageously be a magnetic drum device or a circuit employing a double beam storage tube. A storage tube of this general type has been discussed in the literature (see e.g., Zworykin and Morton, Television, (1940), page 326 et seq.). The signal stretcher expands the remaining frames or portions of the signal in the time domain to fill the gaps left in the signal by the gating process so that reduced channel capacity transmission may be accomplished. The signal is then transmitted through medium or channel 30 by any of the well known techniques, with or without encoding, and supplied to receiver 20 wherein the signals are compressed by signal compressor 21 so that they occupy the original time period of the incoming signals. Signal compressor 21 likewise may comprise a storage tube device or any other device described in the literature.

Each signal, after restoration, is simultaneously supplied to delay network 22 and to an adder circuit 23 in such a manner that a continuous output signal is produced. In the illustrated arrangement, the full length of the delay device is equal to the period of the discarded portion of the input signal. Thus, if the element 22 has a delay of $\frac{1}{30}$ of a second, each received frame of a television signal will appear in the output two successive times. As indicated above, any desired channel saving may be achieved by this method, but at the expense of total information.

In Fig. 2, there is shown a block diagram of a simple illustrative arrangement of the invention wherein a signal supplied to the transmitter is averaged before transmission so that more information is transmitted whereby a more natural reconstruction output signal is produced.

The averaging is accomplished in the system shown by simultaneously passing the incoming signal through delay network 13 and direct path 16 to an adder 14 wherein the two signals are superposed. Delay element 13 is chosen to provide a delay equal to the selected gating period, $\frac{1}{30}$ second or one frame signal time in the exemplary system, whereby successive frame signals are supplied to the adder. Following the averaging process, selected average frame signals are connected by means of a gate circuit 15 to signal stretcher 12. Preferably, each average frame is stretched in time to fill the gaps left in the signal. Alternatively, for multiplex operation, the alternate averaged frame signals may be frames of another television signal. After transmission to receiver 20, the original signal is reproduced, for example, in a manner identical to that of the system in Fig. 1. Other restoring methods may, of course, be employed. While a simple process of averaging adjacent frames has been described, it is to be understood that the various other frame superpositions, including the kind to be described more fully hereinafter, may be advantageously employed.

The operation of the system of Fig. 2 will now be described more fully in connection with the series of graphs of Fig. 3. In line A, there is shown an original sequence of successive television frame signals, while in line B, there is shown the same series of signals after an averaging process. The averaging process may comprise adjacent frame attenuation and addition or, more generally, may follow a predetermined selection and weighting pattern. Thus, the optimum superposition of frames may well include, in addition to the superposition of two or more adjacent frames, the addition of other nearby frames appropriately weighted. This, of course, requires additional delay elements and attenuating devices. If the frames represented in line A are consecutively numbered, then a typical weighted frame may be equal to $$aF_1+bF_2+cF_3 \quad (1)$$

and the next weighted frame selected for transmission may be represented by $$aF_3+bF_4+cF_5 \quad (2)$$

where $F_1$ through $F_5$ represent consecutive frame signals and the coefficients $a$, $b$, and $c$ are subjectively determined weighting or attenuation factors. Successive weighted frame signals are represented in line B, and the average frames selected by the gating process for transmission are indicated in line C. In this illustration, the gating process occurs after the averaging process so that alternate frames are fed to the signal stretcher. It is to be understood, however, that the operations of lines B and C may conveniently be combined to produce the weighted average frames of line C directly.

The average frames stretched for transmission are illustrated in line D, and the received compressed frames are shown in line E. After the repeating process at the receiver is completed, the output video signal illustrated in line F is supplied to any form of utilization device.

The system described above effects a saving in channel capacity by discarding alternate frames and, in a standard television system operating at a rate of 30 frames per second, effectively results in operation at a 15-frame per second rate. Other repetition rates may, of course, be used. For example, in line A of Fig. 4 various superpositions of frames for a 15-frame per second system are shown, i.e., averages composed of portions of two, four, or eight successive frames. Similarly, in line B, two superpositions of frames having a repetition rate of 10 frames per second are illustrated, and in line C (occupying two lines of the drawing) three combinations of frames suitable for use with a repetition rate of 7½ frames per second are shown. Any of the superpositions described above may be produced by a combination of simple signal delay devices and linear adders. One simple and convenient circuit is illustrated in block diagram form in Fig. 5.

In Fig. 5, a video signal supplied to the combining network 50 is simultaneously supplied by way of path 51 without delay, and by way of paths 52 through 56 with delay to an adding network 70. The signal connected to the adder 70 through the attenuator 62 in path 51 is the present value signal weighted in accordance with the appropriate weighting coefficient discussed above. Delay elements 57 through 61 impart period delays, respectively, of 1, 2, 3, 4, and, in general, *n* frame times to the signals appearing in the respective paths to produce the successive frame signals illustrated in Fig. 4. Each of these signals is weighted according to the above-mentioned coefficients by attenuators 63 through 67 before being added together in adder 70. The superposition output signal comprises *n* frames correctly weighted to form one superposition signal representative of the group.

After the system is once operating, the signal appearing in path 54, for example, may be chosen to represent the present value signal in order to provide weighted values of signals appearing both before and after the present value signal.

All of the elements described in the above figures are conventional units well known to those skilled in the art. For example, a delay element capable of providing a television frame delay may preferably be an electromechanical device, of which one suitable form is described on pages 1 through 25 of the "Journal of Acoustical Society of America," January 1948, in an article by D. L. Arenberg entitled "Ultrasonic Solid Delay Lines," together with such amplifying means as is necessary to restore the signal level to its original amplitude. Alternatively, delays of this kind can be realized with electrostatic storage devices, for example, of the type described in an article in the RCA Review, March, 1948, pages 112 through 135, entitled "Barrier Grid Storage Tube and Its Operation." The attenuators may be simple potentiometer or electronic devices and the adders may comprise simple electronic circuits.

There has been described a communication system in which economy in bandwidth is achieved by averaging successive portions of a message signal and transmitting only the average segment representative of each such portion. Particularly in the case of television, the system yields a more pleasing portrayal of motion than the straightforward method of utilizing only selected segments of the signal and discarding the remaining portions. While the invention has been described in terms primarily of television signals, it is obvious that it applies equally well for any complex signal having a relatively low rate of change superimposed upon a rapid rate of change of signal strength.

It is to be understood that the above-described arrangements are illustrative of the application of the principles of the invention. Numerous other arrangements may be devised by those skilled in the art without departing from the spirit and scope of the invention.

What is claimed is:

1. In a system for the transmission of television signals, means for generating for successive groups of frame signals an average frame signal comprising a weighted superposition of all of the frame signals of said group, means for selecting a number of said average frame signals for transmission, means for modifying each selected average frame signal to occupy the time period formerly occupied by said corresponding group of successive frame signals, and means for transmitting said modified frame signals to a receiving station.

2. Transmission apparatus which comprises a source of signal waves consisting of a sequence of wave portions, means for deriving from said sequence of wave portions an auxiliary signal representative of a weighted group of successive portions of said sequence, means for eliminating from said sequence of wave portions a group of successive portions, means for transmitting to a receiving station said auxiliary signal, means at said receiving station for developing a number of successive auxiliary signals to represent said group of successive portions, and means for combining said auxiliary signals to form a facsimile of said original signal wave.

3. In television transmission apparatus the combination of: means for scanning a succession of image frames to produce a succession of electrical frame signals, means for selectively superposing a weighted group of said succession of electrical frame signals to produce an average frame signal representative of all of the individual frames of said group, means for selecting a number of said average frame signals for transmission, means for compressing the time scale of each selected average frame signal, and means for transmitting said compressed frame signals to a receiving station.

4. In a system for the communication of the intelligence of a message wave having components repeated periodically, means for selectively attenuating signals respectively representative of a group of successive wave components, means for superposing said selectively attenuated signals to produce an average signal representative of said group of components, means for modifying said average signal to occupy the time period formerly occupied by said corresponding group of successive signals, and means for transmitting said modified signal to a receiving station.

5. In a system for the transmission of television signals, means for producing a succession of substantially complete frame signals representative of the scene to be transmitted, means for altering the relative magnitude of each of said frame signals in accordance with preassigned weighting coefficients, means for producing a number of complete frame signals each representative of a selected group of successive weighted frame signals, means for modifying the time scale of each of said complete frame signals, and means for transmitting each of said modified frame signals to a receiving station.

6. A television system comprising a transmitter, said transmitter including means for sequentially scanning a picture scene to produce a succession of frame signals, means for eliminating certain selected frame signals from said succession to leave blank intervals, means for storing each of said frame signals removed from said succession, means for weighting certain selected stored frame signals according to a predetermined weighting schedule, means for combining said selected frame signals respectively with one of said frame signals retained in said succession adjacent to the blank interval in said succession formed by the removal of said certain selected frames to produce frame average signals, means for modifying said frame average signals to occupy the time period formerly occupied by said adjacent frame signal and said selected frame signals, means for transmitting said modified frame average signals to a receiving station, means at the receiving station for restoring said modified frame average signals to their original time periods, and means for displaying said frame average signals a number of successive times to produce a facsimile of said picture scene.

7. The method of reducing the bandwidth requirements of a television transmission channel which comprises the steps of developing on a first time scale electrical signals representative of successive image frames, applying selected coefficients of attenuation to the several frame signals thereby to alter the relative magnitudes of said frame signals, superposing consecutive groups of frame signals as thus altered to produce frame average signals on said first time scale, each of said frame average signals being thus formed from all the individual frames and representative of one of said entire groups, redeveloping selected ones of said frame average signals on a second time scale, transmitting said redeveloped frame average signals to a receiver station and, at said receiver station, reestablishing each received frame average signal to said first time scale and repeatedly utilizing each of said frame average signals to reproduce one of said consecutive groups of individual frame signals.

8. In a time division multiplex system for transmitting over one continuous channel a number of signal waves each consisting of a sequence of wave portions, means for deriving from each of said sequences of wave portions an auxiliary signal representative of a group of successive portions of said sequence weighted in accordance with a preassigned schedule, means for intercalating said auxiliary signals derived from each of said sequence of wave portions to produce a continuous output signal, and means for transmitting said output signal to a receiving station.

References Cited in the file of this patent

UNITED STATES PATENTS

| | | |
|---|---|---|
| 1,671,151 | French | May 29, 1928 |
| 1,735,037 | Carpe | Nov. 12, 1929 |
| 2,219,021 | Riesz | Oct. 22, 1940 |
| 2,250,476 | Evans | July 29, 1941 |
| 2,306,435 | Graham | Dec. 29, 1942 |
| 2,652,449 | Graham | Sept. 15, 1953 |
| 2,786,887 | De France | Mar. 26, 1957 |